(12) United States Patent
Wilcox et al.

(10) Patent No.: US 8,064,962 B2
(45) Date of Patent: Nov. 22, 2011

(54) DISPLAYS FOR PORTABLE ELECTRONIC APPARATUS

(75) Inventors: Russell J. Wilcox, Natick, MA (US); Gregory L. Goldfarb, San Francisco, CA (US); Holly G. Gates, Somerville, MA (US); Pehr C. Anderson, Wauwatosa, WI (US)

(73) Assignee: E Ink Corporation, Cambridge, MA (US)

( * ) Notice: Subject to any disclaimer, the term of this patent is extended or adjusted under 35 U.S.C. 154(b) by 1183 days.

(21) Appl. No.: 11/382,320

(22) Filed: May 9, 2006

(65) Prior Publication Data

US 2006/0194619 A1    Aug. 31, 2006

Related U.S. Application Data

(63) Continuation of application No. 09/683,250, filed on Dec. 5, 2001, now abandoned.

(60) Provisional application No. 60/251,443, filed on Dec. 5, 2000.

(51) Int. Cl.
*H04B 1/38* (2006.01)
(52) U.S. Cl. .............. 455/566; 455/550.1; 455/575.1
(58) Field of Classification Search .......... 455/566, 455/550.1, 575.1
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,640,583 A | 2/1987 | Hoshikawa et al. |
| 4,851,820 A | 7/1989 | Fernandez |
| 4,948,232 A | 8/1990 | Lange |
| 5,316,341 A | 5/1994 | Schwartz |
| 5,407,231 A | 4/1995 | Schwartz |
| 5,486,442 A | 1/1996 | Takimoto et al. |
| 5,508,720 A | 4/1996 | DiSanto et al. |
| 5,517,407 A | 5/1996 | Weiner |
| 5,575,554 A | 11/1996 | Guritz |
| D383,750 S | 9/1997 | Disanto et al. |
| 5,760,761 A | 6/1998 | Sheridon |
| 5,777,782 A | 7/1998 | Sheridon |
| 5,808,783 A | 9/1998 | Crowley |
| 5,835,577 A | 11/1998 | Disanto et al. |
| 5,896,575 A | 4/1999 | Higginbotham et al. |
| 5,930,026 A | 7/1999 | Jacobson et al. |
| 5,940,153 A | 8/1999 | Castaneda et al. |
| 5,961,804 A | 10/1999 | Jacobson et al. |
| 5,975,680 A | 11/1999 | Wen et al. |
| 5,983,073 A | 11/1999 | Ditzik |
| 6,016,176 A * | 1/2000 | Kim et al. ................ 349/84 |
| 6,017,584 A | 1/2000 | Albert et al. |
| 6,027,958 A | 2/2000 | Vu et al. |

(Continued)

*Primary Examiner* — Nghi Ly
(74) *Attorney, Agent, or Firm* — David J. Cole (57) ABSTRACT

A portable electronic device, for example a cellular telephone or a personal digital assistant, has an internal screen for the display of information, the electronic device also having an external screen arranged to receive information from the electronic device and being capable of displaying this information on an electro-optic medium. There is also provided a cellular telephone having a visual indicator comprising an electro-optic medium having at least two different display states, the electro-optic medium being arranged to change its display state when a call is received by the telephone.

13 Claims, 4 Drawing Sheets

U.S. PATENT DOCUMENTS

| | | | |
|---|---|---|---|
| 6,032,039 A | 2/2000 | Kaplan | |
| 6,067,185 A | 5/2000 | Albert et al. | |
| 6,118,426 A | 9/2000 | Albert et al. | |
| 6,120,588 A | 9/2000 | Jacobson | |
| 6,120,839 A | 9/2000 | Comiskey et al. | |
| 6,128,124 A | 10/2000 | Silverman | |
| 6,130,773 A | 10/2000 | Jacobson et al. | |
| 6,130,774 A | 10/2000 | Albert et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,297,945 B1 | 10/2001 | Yamamoto | |
| 6,300,932 B1 | 10/2001 | Albert | |
| 6,301,038 B1 | 10/2001 | Fitzmaurice et al. | |
| 6,311,076 B1 * | 10/2001 | Peuhu et al. | 455/566 |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,327,482 B1 | 12/2001 | Miyashita | |
| 6,376,828 B1 | 4/2002 | Comiskey | |
| 6,377,387 B1 | 4/2002 | Duthaler et al. | |
| 6,381,468 B1 | 4/2002 | Larsen et al. | |
| 6,392,786 B1 | 5/2002 | Albert | |
| 6,413,790 B1 | 7/2002 | Duthaler et al. | |
| 6,445,489 B1 | 9/2002 | Jacobson et al. | |
| 6,445,933 B1 | 9/2002 | Pettit | |
| 6,466,369 B1 * | 10/2002 | Maddock | 359/460 |
| 6,470,196 B1 | 10/2002 | Yamashita | |
| 6,473,072 B1 | 10/2002 | Comiskey et al. | |
| 6,577,496 B1 | 6/2003 | Gioscia et al. | |
| 6,640,113 B1 | 10/2003 | Shim et al. | |
| 6,643,124 B1 * | 11/2003 | Wilk | 361/679.04 |
| 6,643,373 B1 | 11/2003 | Hughes | |
| 2001/0034249 A1 | 10/2001 | Peuhu et al. | |
| 2001/0045934 A1 | 11/2001 | Turner et al. | |
| 2002/0019081 A1 | 2/2002 | Denis et al. | |
| 2002/0053900 A1 | 5/2002 | Jacobson et al. | |
| 2002/0063677 A1 | 5/2002 | Drzaic | |
| 2002/0113770 A1 | 8/2002 | Jacobson et al. | |

* cited by examiner

Fig. 6

DISPLAYS FOR PORTABLE ELECTRONIC APPARATUS

CROSS REFERENCE TO RELATED APPLICATIONS

This application is a continuation of application Ser. No. 09/683,250, filed Dec. 5, 2001 (Publication No. 2002/0090980, now abandoned), which itself claims priority from Provisional Application Ser. No. 60/251,443 filed Dec. 5, 2000; the entire disclosure of the aforementioned applications is herein incorporated by reference.

BACKGROUND OF INVENTION

The present invention relates to portable electronic apparatus, for example, a cellular telephone or a personal digital assistant (PDA) having an external screen for the display of information.

In another aspect, this invention relates a cellular telephone having a visual indicator arranged to indicate when a call is received.

The use of cellular telephones and other similar wireless telephones, for example direct satellite telephones (for convenience all such wireless telephones will hereinafter be referred to as "cell phones") is expanding rapidly throughout the world, and an increasing proportion of such phones are now equipped for wireless data access, either through the Internet or other data access systems, including E-mail systems. For example, traveling businesspeople require continuous access to their E-mail and often also need access to facsimiles and the resources available on the Internet or World Wide Web.

Unfortunately, because of the need for portability, the displays of most cell phones are inadequate for displaying anything more complicated than telephone numbers and brief textual E-mail messages. In particular, a typical cell phone display is wholly inadequate for displaying any reasonably complicated graphics, yet there are many occasions where field personnel urgently need access to corporate databases containing such graphics. For example, a technician encountering a faucet, refrigerator or television set of a type with which he is not familiar may require access to a database describing the type. At present, Internet access using cell phones is mainly confined to sites with special simple designs which can be viewed on a typical cell phone screen. Obviously, users would prefer the same Internet access which they have from their computers, and site owners would prefer to avoid the expense and inconvenience of maintaining separate sites for computer and cell phone use, especially in view of synchronizing such sites.

The problems with cell phone screens can only become worse as so-called "third generation" (3G) cell phones are developed. Such third generation phones, using special digital protocols, should provide data transfer at rates similar to those of broadband wired access, but will have no good way of displaying the large amounts of data they receive.

There is thus a clear need to equip cell phones with some type of auxiliary display which is substantially larger and has higher resolution than the display provided on the cell phone itself. One solution is to provide an interface between the cell phone and a portable computer, thus enabling text and graphics transmitted to the cell phone to be displayed on the computer screen, and such interfaces are well known in the art. However, the need for the portable computer greatly increases the traveling weight of the unit, and it may be inconvenient to connect the cell phone, the interface unit and the computer in the field. Furthermore, the liquid crystal display (LCD's) conventionally used portable computers are fragile and are likely to be damaged if they are thrown into a bag with a technician's tools or left where such tools might accidentally be dropped on them. Similar problems are encountered if one attempts to use an LCD monitor as the external display for a cell phone. Furthermore, the power requirements of personal computers or LCD monitors are so great that, unless a very large and heavy battery is used, the maximum time of operation on batteries of the external display will be substantially shorter than that of the cell phone.

Accordingly, there is a need for a cell phone to be equipped with an auxiliary display which is larger and has higher resolution than the display provided on the cell phone itself, but which is lighter, less complicated and less expensive than a personal computer or LCD monitor, and this invention seeks to provide a solution to this problem.

Essentially the same problems exists with PDA's, which have small screens inadequate for displaying web pages and other graphics, and, as more and more portable, hand-held electronic devices are developed, the problems of inadequate screens and/or excessive power consumption will be exacerbated.

Another problem with cell phones is that they often ring at embarrassing times. Users of cell phones have received considerable criticism because of the distraction and disruption which occurs when such phones ring in restaurants, cinemas, theaters or similar places of entertainment, public and business meetings, worship services and other types of meetings. Under such circumstances, the user of a cell phone needs some way to know when a call is received, without the inconvenience and embarrassment of an audible ring. In an attempt to avoid this problem, many cell phones are equipped with an indicator which vibrates when a call is received, and a switch to enable the user to select the ringing or vibrating indicator. However, such vibrating indicators give rise to other problems. They are usually satisfactory when the cell phone is carried on the user, for example on a belt or in a pocket. However, many women carry cell phones in a purse and may not notice the vibrating indicator. Furthermore, is the cell phone is removed from the purse and placed on a table, desk or similar hard surface, the surface may act as a sounding board, and when the vibrating indicator is activated, may generate a noise which is at least as distracting as a ringing indicator.

One approach to solving this problem is to provide a visual rather than audible warning of an incoming call. However, most conventional visual warning devices are ill-suited for use with cell phones. Conventional small incandescent bulbs, such as are use in flash lights, may prove too fragile when subjected to the handling to which cell phones are subjected, and may impose current demands larger than those conveniently supplied by cell phone batteries. A light emitting diode could be used as a visual indicator, but draws power continuously, thus reducing the operating time of the cell phone, and is only visible over a limited range of orientations. Also, a light emitting diode covers only a few square millimeters, and thus may not be visible when the phone is placed in certain positions relative to the user.

This invention seeks to provide a visual indicator for a cell phone which does not suffer from the aforementioned disadvantages.

SUMMARY OF INVENTION

In one aspect, this invention provides a portable electronic device having an internal screen for the display of information, the electronic device also having an external screen arranged to receive information from the electronic device and being capable of displaying this information on an electro-optic medium. This invention is especially, though not exclusively, intended for use with cell phones and PDA's. This device of the invention may hereinafter be called an "external screen device".

In another aspect, this invention provides a cellular telephone having a visual indicator comprising an electro-optic medium having at least two different display states, the electro-optic medium being arranged to change its display state when a call is received by the telephone. This cell phone may hereinafter be called a "visual indicator cell phone".

Finally, this invention provides an external display for use with a portable electronic device having a data output port, the external display comprising data transmission means for transmitting data from the portable electronic device to the external display, the data transmission means having at least one connector arranged to engage the data output port of the portable electronic device, the external display further comprising an electro-optic medium arranged to display data received by the external display via the data transmission means.

The accompanying drawings are not strictly to scale, emphasis instead generally being placed upon illustrating the principles of the invention.

DETAILED DESCRIPTION

As already mentioned, in a first aspect this invention provides a portable electronic device, such a cell phone or PDA, having an internal screen for the display of information, the electronic device also having an external screen arranged to receive information from the electronic device and being capable of displaying this information on an electro-optic medium.

The external screen should be portable, and will typically be from about 2 to about 14 inches (51 to 355 mm.), measured diagonally and preferably from about 4 to about 10 inches (101 to 254 mm.) so measured. The external screen is desirably less than about one half inch (13 mm.) in thickness and preferably less than about one quarter inch (6 mm.). The external screen should generally weigh less than about one pound (454 g.) and desirably less than about 6 ounces (170 g.).

To be a useful improvement over conventional internal cell phone displays, the external screen should have a larger number of pixels than the internal screen in at least one, and preferably both, dimensions. However, this is not absolutely essential; for example, a color external screen could be used for Internet access to supplement a monochrome internal screen to ease comprehension of material, such as electrical wiring diagrams, in which color is essential for full understanding. The external screen will typically have a resolution of at least 64×120 pixels and desirably half-VGA (320×240) or full-VGA (640×480) resolution or better.

As discussed in the various patents and applications mentioned below, electro-optic materials can be formed into flexible displays, and the resultant ability to form flexible external screens is an important advantage of the present invention. Using a flexible external screen has the important advantage that the external screen can be movable between a retracted position, in which less than the full display area of the external screen is displayed, and an extended position, in which substantially the full display area of the external screen is displayed, the external screen extending a greater distance from the housing of the device in its extended position than in its retracted position. Such a retractable external screen renders the screen less likely to be damaged when the cell phone is not in use, and also makes the stored cell phone less bulky to carry.

In one form of such a device, in its retracted position a major portion, and preferably substantially all, of the external screen may lie within the housing. For example, the external display could have the form of a scroll which could would around a rotatable member, the scroll lying flat against the side of the cell phone, or within the housing of the cell phone, when retracted, but extensible to form a flat external screen. Alternatively, the retracted external screen could have a folded (for example, concertina form) or serpentine configuration (the latter may be preferred because it is easier to form electrical conductors which are flexible enough to withstand bending of the screen into a serpentine configuration than it is to form conductors which will withstand sharp folds) so that it folds tightly against the side of the cell phone when not in use, but can be extended to form a flat screen.

In either case, the cell phone is desirably provided with one or more support members arranged to support the external screen in its extended position. Conveniently, the support member or members are themselves retractable, being movable between an extended position, in which they are arranged to support the external screen in its extended position, and a retracted position, in which they lie closer to the housing of the cell phone than in their extended position. For example, the support members could fold out from the housing when the external display is in use. Such retractable support members have the advantages of being less susceptible to damage while the cell phone is not in use, and also reduce the bulk of the phone when not in use.

The external screen may draw power solely from a battery located within the cell phone, eliminating the need for a separate battery, although the external screen could of course have its own battery if desired. Desirably, the electro-optic medium used in the external screen should draw power primarily during image update so that the screen is primarily drawing no power even while the user is reading. In this connection, the bistable nature of some electro-optic display media, as discussed in detail below, greatly reduces the power requirements of the external display. The external screen typically will contain row and column drivers and in some cases a separate controller.

The external screen may be used purely for output (data display), but it could be provided with a least one manually-operable data input means, for example a touchscreen or one or more push buttons. Alternatively or in addition, the data input means could comprise a pointing device, for example a small trackball. One preferred external screen device variant of the invention uses a simple sequence of four to eight buttons along one side of the external screen in a manner similar to that commonly used for automated teller machine (ATM's) displays, personal digital assistants (PDA's), or handheld computers, thus permitting a useful degree of interactivity. A jog dial or a mouse may be used to select options or scroll between pages. However the external screen device need not have any buttons, relying on the cell phone inputs for selection and control.

As already indicated, the electro-optic medium used in the present external screen device is desirably bistable, so that it only draws power as the screen is being redrawn. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist without power for at least several times, for example at least four times, the minimum duration of the addressing pulse required to change the state of the display element. Some electro-optic media are capable of gray scale and are stable not only in their extreme black and white states but also in their intermediate gray states. Thus, this type of display is properly called "multi-stable" rather than bistable, although the latter term may be used for convenience herein.) The electro-optic medium is also desirably reflective rather than transmissive, since this eliminates the need for a backlight, and thus the power drain associated with such a backlight.

To achieve legibility in typical office lighting conditions, the reflective display should have a reflectivity of at least one-third the brightness of white paper and a contrast ratio of at least 6 to 1, similar to newspapers, but ideally 10 to 1 or better. Ideally the display should be such that it can be used as a source for typical copier machines, so that a mobile worker could access a document, copy it from the external display using a standard copier, and thereby obtain printouts with good resolution and readability.

The external screen device of the invention may function as both a cell phone and a PDA. Many PDA's are today being provided with cell phone capability. However, an external screen device of the present invention permits PDA functions to be added to a cell phone, and web software used to permit the user to access PDA functions such as address book and calendar over a network. Thus, the cell phone and external display together make a cheap, thin mobile client that can nevertheless benefit from intense computations or large-scale database access back on the server end.

The external display screen may be attached to the cell phone by any suitable physical means and using any suitable protocol. For example, the cell phone may serve as a universal serial bus (USB) master and the display device as a USB slave. This permits the device to access both data and adequate power in a well-defined and cross-device standardized way at a low incremental hardware cost. Furthermore cell phones with USB masters could drive data to many other peripherals including large electronic ink signs and many multimedia devices. In addition, USB or similar standards permit a large number of devices to be daisy-chained or networked to a single cell phone in an easy manner so that all the devices can share one external network access point.

While USB is a more elegant solution, serial lines, IIC, and 8-bit parallel are the current standard communication methods for cell phones, and these may also be implemented in the present invention.

Providing an external screen with a common resolution such as VGA would enable many wireless application providers to all write to a common standard. Support for a common markup language such as HTML or XML would enable many types of external portable screens to exist and to benefit from the same wireless applications, spawning a new class of cell phone peripherals.

In the external screen device of the present invention, the external screen may be detachable from the cell phone, and/or may be supplied as an after-market accessory which can be temporarily or permanently attached to a cell phone. Desirably, the external screen is provided with a mechanism which provides universal attachment of a small ("pocket sized") external screen to the side of a cell phone so as to facilitate single handed use of the system. For example, a plastic slide track piece with an adhesive back may be sold with the screen. The slide track is attached to the side of the cell phone when the user wishes to add the external screen functionality. The track can be made low profile so that it does not materially impact the form factor of the original cell phone. The edge of the external screen (or part of the top half of the edge) may be designed so it can be easily slid, secured, and removed from the track.

Also a cable for the external screen can be spooled within the footprint of the unit so as to preserve portability and avoid mishandling during transport. The advantages of this approach are: 1) universality, 2) simplicity, 3) low cost, 4) no additional loose parts/cradles, 5) no significant volume added to the phone when the external display is not in use, 6) people can use the product in either of two configurations.

Since the external screen will typically be bistable, the cell phone need not buffer data for a complete screen. Instead the cell phone may write out all or a portion of the screen information in a manner similar to outputting to a printer rather than operating a traditional display. Thus, a large image may be created by refreshing discrete portions of the display sequentially. Reducing the buffer memory needs of the cell phone in this manner greatly reduces its cost. The device would not need RAM, a microprocessor, flash memory, or a battery, although it would typically still need a microcontroller. Because the electronic ink external display can update in parts, it can also employ peripheral communications standards like USB rather than high-speed clocked data lines, such as are used by most LCD displays.

The typical energy draw for portable cell phone screens is based on sizes ranging from 1-4 inch (25 to 101 mm.) diagonals, and consists of 44 J power draw (25 J for the display and 19 J for the backlight) assuming a typical usage model (8 hour day, 5% transmit, 5% receive, 90% standby, backlight times out 10 seconds after last key press, total use 60 minutes/day for 6 calls of 10 minutes each; shows only time, date and signal strength in standby). Since the total energy budget for the cell phone is 26855 J, this is a tiny fraction of the energy budget. The display may draw 1.2 mW/0.9 mW during talk/standby, but while the buttons are being pressed the backlight is on and draws 108 mW. (Source: R. Akins "Displays for Hand-held Portable Electronic Products", SID (Society for Information Display) Invited Paper, SID Digest, May 2000).

An external screen using an electronic ink display medium need draw very little power. It is estimated that a USB external cell phone display would use about 20 mA during an update (most of which goes to powering the microcontroller), which might last 1 second. If an update took place once every 10 seconds this would be a steady state power draw of 20 mA*5V (USB power)*1 sec/10 sec=10 mW. Over one hour, this would use 36 J, an almost negligible amount of power. Thus, while there could be batteries in the display, preferably the external display is powered by the phone, thus reducing the cost of the external display and maximizing its portability.

The visual indicator cell phone of the present invention will now be discussed in detail. As already mentioned, this cell phone uses a visual indicator comprising an electro-optic medium of variable optical appearance to provide a visual indication when a call is received by the phone. Although the visual indicator could simply change from one state to another (say from black to white) when a call is received, the human eye is far more sensitive to changes in optical appearance than to optical appearance itself. Accordingly, it is desirable that the visual indicator be arranged to "flash" (i.e., to change repeatedly between its two display states) when a call is received by the phone.

Electro-optic visual displays are well suited to act as a visual indicator for a cell phone. To enable the cell phone to be used with services such as caller ID and call waiting, desirably the electro-optic medium has at least two modes of changing repeatedly between it two or more display states. Different colors, frequencies, intensities or other visual cues may be used in combination with caller ID or call waiting to indicate information about the call. Other visual states such as voice mail or E-mail waiting may also be visually indicated.

The electronic ink visual indicator may be attached to the surface of the cell phone or be present in an external cellphone case or other peripheral attachment. (In saying that the visual indicator is present on an external surface of the cell phone or other object, we do not exclude the possibility that the visual indicator may be overlain by one or more substantial transparent layers, provided only that the visual indicator is readily visible to a user of the cell phone or other object. Most electro-optic media require electrodes on both sides of the medium, so the visual indicator will usually have a substantially transparent electrode overlying the electro-optic medium itself. In addition it may be desirable to cover the electro-optic medium with one or more protective layers to protect the medium itself against any combination of moisture, ultra-violet radiation, and the sweat or skin oils of a user holding the cell phone.) The visual indicator may be curved, flexed or conformed to the surface. In order that it may be conspicuous, the visual indicator desirably covers a large portion of the surface on which it is provided. Typically, the visual indicator should cover an area of at least about 1 $cm^2$; when provided on the external surface of the cell phone, it desirably covers at least about 5 per cent of the external surface of the cell phone.

The thin, flexible nature of certain electro-optic media allows them to cover a surface in an ergonomic, lightweight way while still achieving a large display area, which is a critical requirement for a visual indicator. The visual indicator may be wrapped around multiple sides of the cell phone, so that it is visible regardless of the orientation of the phone. Typically, the external surface of a cell phone will comprise at least three separate surfaces, and the visual indicator should be present on at least two of these surfaces. Many cell phones have a substantially cuboidal form with a front surface bearing a key pad, an opposed rear surface, and at least two side opposed surfaces and two opposed end surfaces extending between the front and rear surfaces, and in such phones it is desirable that the visual indicator be present on the rear surface and an opposed pair of the side and rear surfaces, so that when the cell phone is placed face down on a surface, the visual indicator will be visible from almost any direction.

In certain special situations, for example cell phones intended for noisy industrial environments, the visual indicator may be the only ring indicator present on the cell phone. However, most users will prefer a choice between audible and visual "ringing" and thus desirable the cell phone comprises an audible indicator means for indicating when a call is received by the phone, and selector means whereby a user may select operation of either the visual indicator means or the audible indicator means when a call is received.

As already indicated, the low power requirement of many electro-optic media permits the visual indicator to function with minimal battery drain. The bistability of such media allows persistent "flags", such as E-mail or voice mail flags, to remain visible without drawing power. The light weight of an electro-optic visual indicator achieves its functionality with minimal reduction of portability.

In both the external screen device and visual indicator cell phone of the present invention, a variety of electro-optic media may be used. The electro-optic medium could, for example, be of the rotating bichromal object type as described, for example, in U.S. Pat. Nos. 5,777,782 and 5,760,761. The electro-optic medium could also be an electrochromic medium, a preferred electrochromic medium being a nanochromic film comprising an electrode formed at least in part from a semi-conducting metal oxide and a plurality of dye molecules capable of reversible color change attached to the electrode. Nanochromic films of this type are described, for example, in International Applications Publication Nos. WO 98/35267 and WO 01/27690; the entire contents of these two applications are herein incorporated by reference.

However, the presently preferred type of electro-optic medium is an electrophoretic medium, preferably an encapsulated electrophoretic medium. Electrophoretic displays have been the subject of intense research and development for a number of years. Such displays can have attributes of good brightness and contrast, wide viewing angles, state bistability, and low power consumption when compared with liquid crystal displays. Numerous patents and applications assigned to or in the names of the Massachusetts Institute of Technology and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; and 6,323,989, and in International Applications Publication Nos. WO 97/04398; WO 98/03896; WO 98/19208; WO 98/41898; WO 98/41899; WO 99/10769; WO 99/10768; WO 99/10767; WO 99/53373; WO 99/56171; WO 99/59101; WO 99/47970; WO 00/03349; WO 00/03291; WO 99/67678; WO 00/05704; WO 99/53371; WO 00/20921; WO 00/20922; WO 00/20923; WO 00/26761; WO 00/36465; WO 00/38000; WO 00/38001; WO 00/36560; WO 00/36666; WO 00/59625; WO 00/60410; WO 00/67110; WO 00/67327 WO 01/02899; WO 01/07691; WO 01/08242; WO 01/17029; WO 01/17040; and WO 01/80287. The entire disclosures of all these patents and published applications are herein incorporated by reference.

An encapsulated, electrophoretic medium typically does not suffer from the clustering and settling failure mode of traditional electrophoretic media and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Since the preferred types of encapsulated electrophoretic media for use in the present invention are identical to those described in the aforementioned patents and applications, they will not be described in detail herein, the reader being referred to these patents and applications for full details.

Preferred embodiments of the invention will now be described, though by way of illustration only, with reference to the accompanying drawings.

Figure 1:
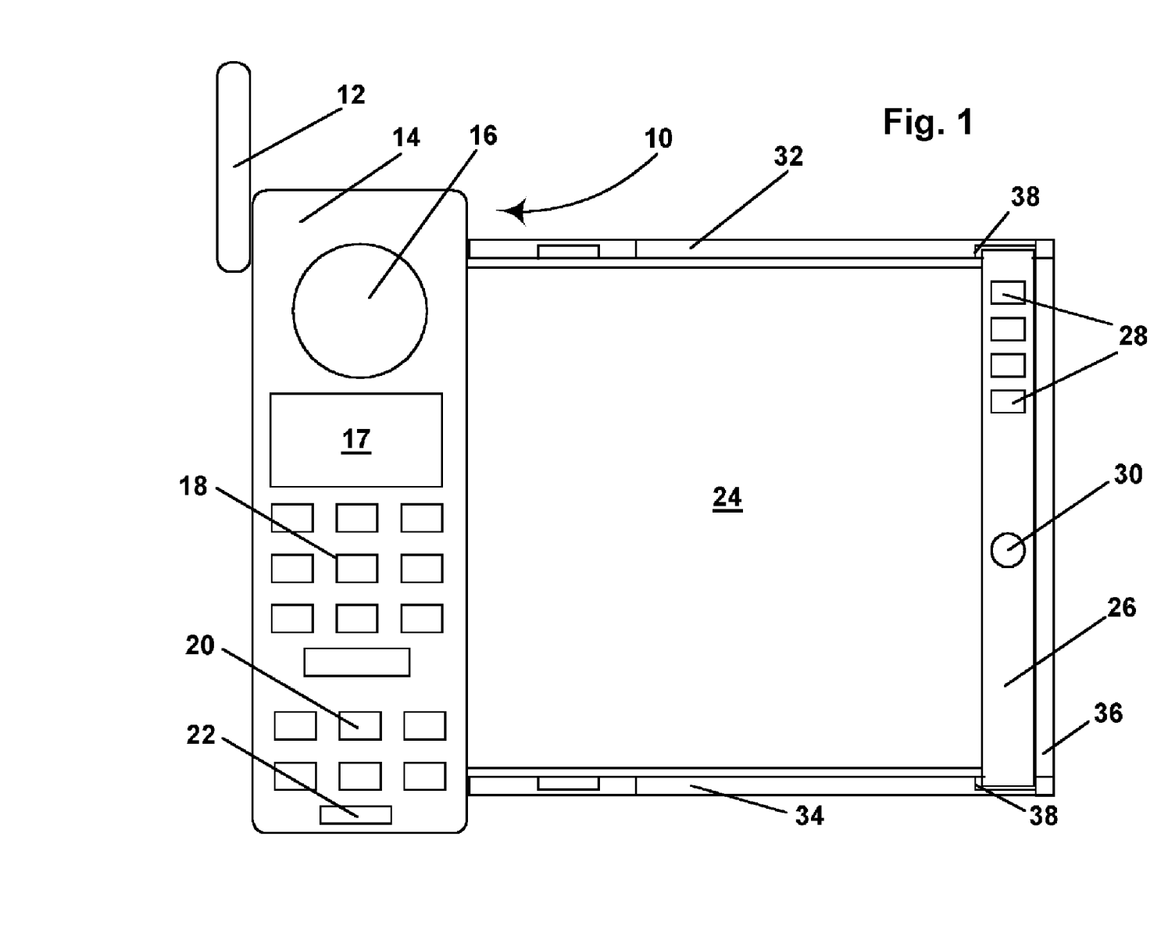
FIG. 1 of the accompanying drawings is a schematic front elevation of an external screen device of the invention with its external screen in its extended position.

The external screen device of the present invention shown in FIG. 1 is a cell phone (generally designated 10) having a substantially cuboidal housing to one side of which is attached an antenna 12. The front surface 14 of the housing carries an earpiece 16, a small internal screen 17 for the display of data, a main key pad 18 comprising ten keys numbered 1-9 and 0 in the conventional key pad layout (the markings on these and other keys described below are omitted from the drawings to avoid unnecessary clutter), and an auxiliary key pad 20, which contains six keys used for special functions needed in a cell phone, such as "power", "send" etc. Finally, the front surface 14 carries a microphone 22. All the components of the cell phone 10 so far described are conventional and hence will not be further described herein.

Figure 2:
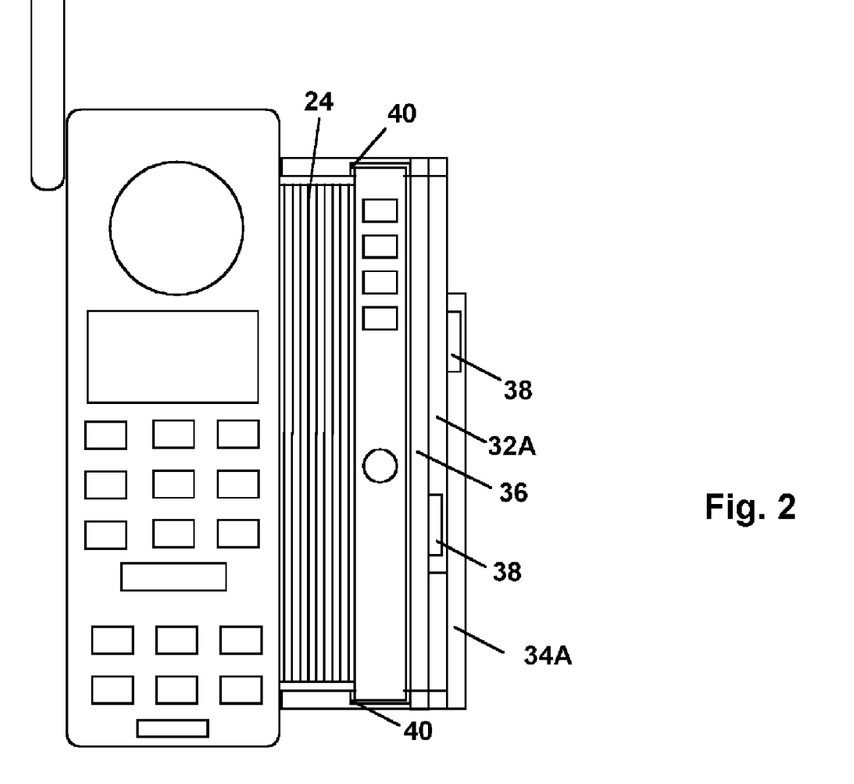
FIG. 2 is a front elevation similar to that of FIG. 1 but showing the external screen in its retracted position.

However, in addition, the cell phone 10 is provided with a flexible external screen 24, which is movable between an extended position, shown in FIG. 1, in which the screen is held substantially flat so that the full display area of the screen is visible to a user, and a retracted position, shown in FIG. 2, in which the screen 24 is "folded" in a serpentine configuration against the housing of the cell phone. The screen 24 comprises an encapsulated electrophoretic medium ("an electronic ink") on which data from the cell phone can be displayed.

The screen 24 is provided, along its edge remote from the housing, with an end member 26, which is formed of a rigid plastic material and which bears four push buttons 28 and a miniature trackball 30; when the trackball 30 is in use, the lower two (in FIG. 1) of the push buttons 28 are employed as the buttons needed for the trackball 30 to be used in the conventional manner.

The cell phone 10 further comprises a top support member 32, a bottom support member 34 and an end support member 36, which together form a frame surrounding the screen 24 and the end member 26. (Those skilled in mechanical engineering will appreciate that some interlocking mechanism is needed to enable to support members 32, 34 and 36 to be stable in the positions shown in FIG. 1 but still able to move to the positions shown in FIG. 2, as described below. However, since such interlocking mechanism can be of any conventional type, it will not be described in detail herein.) The end member 26 extends slightly beyond the side edges (the top and bottom edges as illustrated in FIG. 1) of the screen 24 and the projecting end portions of the end member 26 are received into recesses 38 provided in the top and bottom support members 32 and 34, these recesses serving to hold the end member 26 in position and thus holding the screen 24 substantially flat in the optimum configuration for viewing.

As illustrated in FIG. 2, when the screen 24 is not needed for displaying data (for example during voice calls), it can be retracted to the retracted position shown in this Figure. The end member 26 is removed from the recesses 38 and inserted into recesses 40 in the top and bottom support members 32 and 34, these recesses 40 lying close to the phone housing. The screen 24 is held between the end member 26 and the housing as a series of serpentine folds; if, as is typically the case, the screen 24 includes a plastic substrate, this substrate may be given a "set" to facilitate the screen 24 adopting the correct serpentine configuration. The end support member 36 is temporarily detached from the top and bottom support members 32 and 34, moved to a position adjacent the end member 26 and again attached to the support members 32 and 34. Each of the support members 32 and 34 is, as shown in FIG. 2, in two sections connected hinged adjacent the recesses 40, and the outer sections, designated 32A and 34A, of the support members 32 and 34 respectively are folded at right angles to the adjacent sections so that they lie parallel to the length of the end member 26 and immediately "outside" (to the right in FIG. 2) the end support member 36. It will be seen that retracting the screen 24 in this manner greatly reduces the bulk of the cell phone 10 when the screen 24 is not required.

Figure 3:
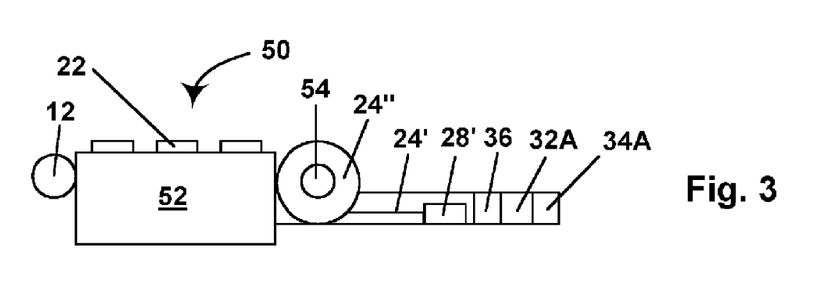
FIG. 3 is a schematic end elevation of a second external screen device of the invention with its external screen in its retracted position.

FIG. 3 shows an end elevation of a second external screen cell phone (generally designated 50) of the present invention which resembles that shown in FIGS. 1 and 2 but which has a different arrangement for storing the retracted external screen 24', the end elevation being taken in a direction corresponding to looking upwardly from the lower end of FIG. 2, the external screen 24' being shown in its retracted position. The cell phone 50 has a housing 52, and the external screen is provided with an end member 28 and top, bottom and end support members, all of which are essentially identical to those shown in FIG. 2. (The portion of the bottom support member adjacent the housing 52 is omitted from FIG. 3 to show details of the retracted screen 24'.) However, instead of being stored in a folded serpentine configuration as shown in FIG. 2, the screen 24' is stored in a scroll-like fashion. To this end, a spindle 54 is rotatably mounted on the top and bottom support members adjacent the housing 52. As the screen 24' is retracted, it is wound around the spindle 54, the portion of the screen 24' wound in a helical configuration around the spindle being denoted 24" in FIG. 3. Although not shown in FIG. 3, the spindle 54 is provided with biasing means in the form of helical springs (other types of biasing means may of course be substituted) which bias the spindle 54 to rotate clockwise in FIG. 3, so that once the screen 24' is released from recesses corresponding to the recesses 38 shown in FIGS. 1 and 2, the screen 24' will automatically wind around the spindle 54 under the bias provided by the biasing means.

Figure 4:
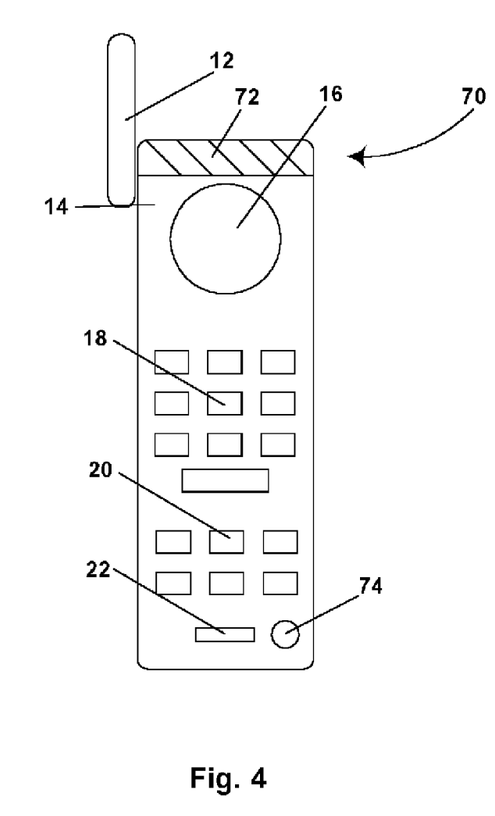
FIG. 4 is a schematic front elevation of a visual indicator cell phone of the invention.
Figure 5:
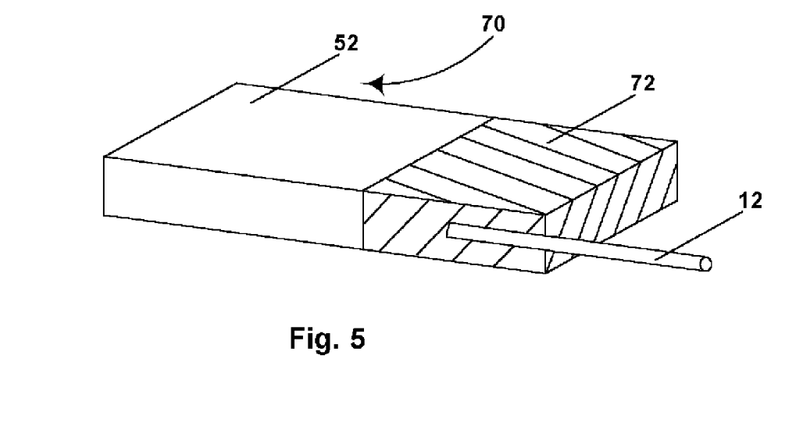
FIG. 5 is a three-quarter view, from behind and to one side of, the visual indicator cell phone shown in FIG. 4.

The visual indicator cell phone (generally designated 70) shown in FIGS. 4 and 5 is similar to that shown in FIG. 1 except it lacks both the internal screen 17 and the external screen, although either or both of these screens could be provided if desired. As best seen in FIG. 5, the housing 52 of cell phone 70 is essentially cuboidal, having a front surface 14, an opposed rear surface, and opposed pairs of end surfaces and side surfaces extending between the front and rear surfaces. As indicated by the shading in FIGS. 4 and 5, the cell phone 70 is provided with a visual indicator 72 which covers a small area at the upper end (in FIG. 4) of the front surface 14, the whole of the adjacent end face and large portions of the rear and both side surfaces (only one side surface is visible in FIG. 5, but a corresponding portion of the other side surface is also covered by the visual indicator 72). The visual indicator 72 is arranged to flash black and white when a call is received. The cell phone 70 is also provided with a conventional audible ring indicator, and a toggle button 74 (FIG. 4) is provided adjacent the microphone 22 to enable the user to toggle between the audible and visual indicators.

Figure 6:
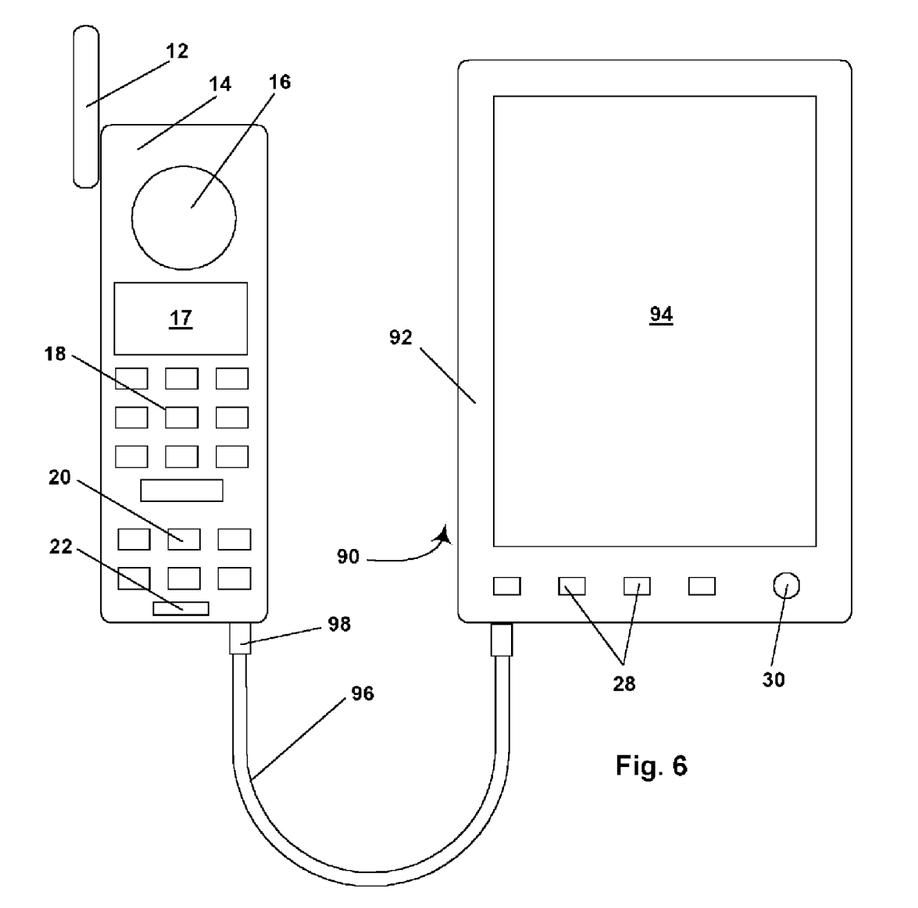
FIG. 6 shows an external display of the invention in use with a cell phone.

FIG. 6 illustrates an external display (generally designated 90) of the present invention in use with a cell phone essentially identical to that shown in FIGS. 1 and 2. The external display comprises a housing 92, having essentially the form of a flat cuboid, and an electro-optic screen 94 located within the housing 92. The housing 92 is provided adjacent one edge with buttons 28 and a trackball 30 similar to the corresponding device shown in FIGS. 1 and 2. However, the external display is not mounted upon the cell phone but is detachably connected thereto by means of a flexible cable 96, this cable being plugged by means of a connector 98 into a data output socket (not shown) provided on the cell phone. The cable 96 enables data to be transmitted from the cell phone to the external display, and may also provide for data transmission in the opposed direction, so that, for example, data input by means of the buttons 28 or trackball 30 may be conveyed to the cell phone. Many cell phones are already equipped with serial ports to enable them to be used with external modems, and these serial ports may be employed as the data output socket for communication with the external screen.

From the foregoing description, it will be seen that the external screen display of the present invention greatly reduces the problems associated with displaying data on portable, hand-held electronic devices. It will also been seen that the visual indicator cell phone of the present invention solves most of the problems associated with the use of audible ring indicators on cell phones.

While the invention has been particularly shown and described with reference to specific preferred embodiments, it should be understood by those skilled in the art that various changes in form and detail may be made without departing from the spirit and scope of the invention. For example, although the external display shown in FIG. 6 is illustrated with only a series of buttons and a trackball, it will readily be apparent that such an external display could incorporate a keyboard, thus greatly facilitating the use of the attached cell phone for sending E-mail. Accordingly, the whole of the foregoing description should be construed in an illustrative and not in a limitative sense, the invention being defined solely by the appended claims.

The invention claimed is:

1. A portable electronic device having an internal screen for the display of information, the electronic device also having a flexible external screen arranged to receive information from the electronic device and being capable of displaying said information on a bistable electro-optic medium, the device further comprising a housing, the external screen being movable between a retracted position, in which less than the full display area of the external screen is displayed, and an extended position, in which substantially the full display area of the external screen is displayed, the external screen extending a greater distance from the housing in its extended position that in its retracted position, the device further comprising an end support member and two side support members which, when the external screen is in its extended position, serve to hold the external screen substantially flat, each of the side support members comprising a pivotable section which, when the external screen is in its extended position, extends away from the housing but which, when the external screen is in its retracted position, can be pivoted to lie adjacent the housing.

2. A portable electronic device according to claim 1 comprising a cellular telephone.

3. A portable electronic device according to claim 1 comprising a personal digital assistant.

4. A portable electronic device according to claim 1 wherein the external screen has a larger number of pixels than the internal screen in both dimensions.

5. A portable electronic device according to claim 1 wherein the external screen is from about 2 to about 14 inches in size, measured diagonally.

6. A portable electronic device according to claim 1 wherein, in its refracted position, the external screen has the form of a scroll wound around a rotatable member.

7. A portable electronic device according to claim 1 wherein the external screen is arranged to draw power from a battery located within the portable electronic device.

8. A portable electronic device according to claim 1 wherein the external screen is provided with at least one manually-operable data input means.

9. A portable electronic device according to claim 1 wherein the external screen is detachable from the portable electronic device.

10. A portable electronic device according to claim 1 wherein the electro-optic medium comprises a rotating bichromal member medium.

11. A portable electronic device according to claim 1 wherein the electro-optic medium comprises an electrochromic medium.

12. A portable electronic device according to claim 1 wherein the electro-optic medium comprises an electrophoretic medium.

13. A portable electronic device according to claim 12 wherein the electrophoretic medium is an encapsulated electrophoretic medium.

* * * * *